Dec. 1, 1959   R. B. MICHELL   2,914,853
NAVIGATIONAL APPARATUS
Filed Aug. 15, 1955
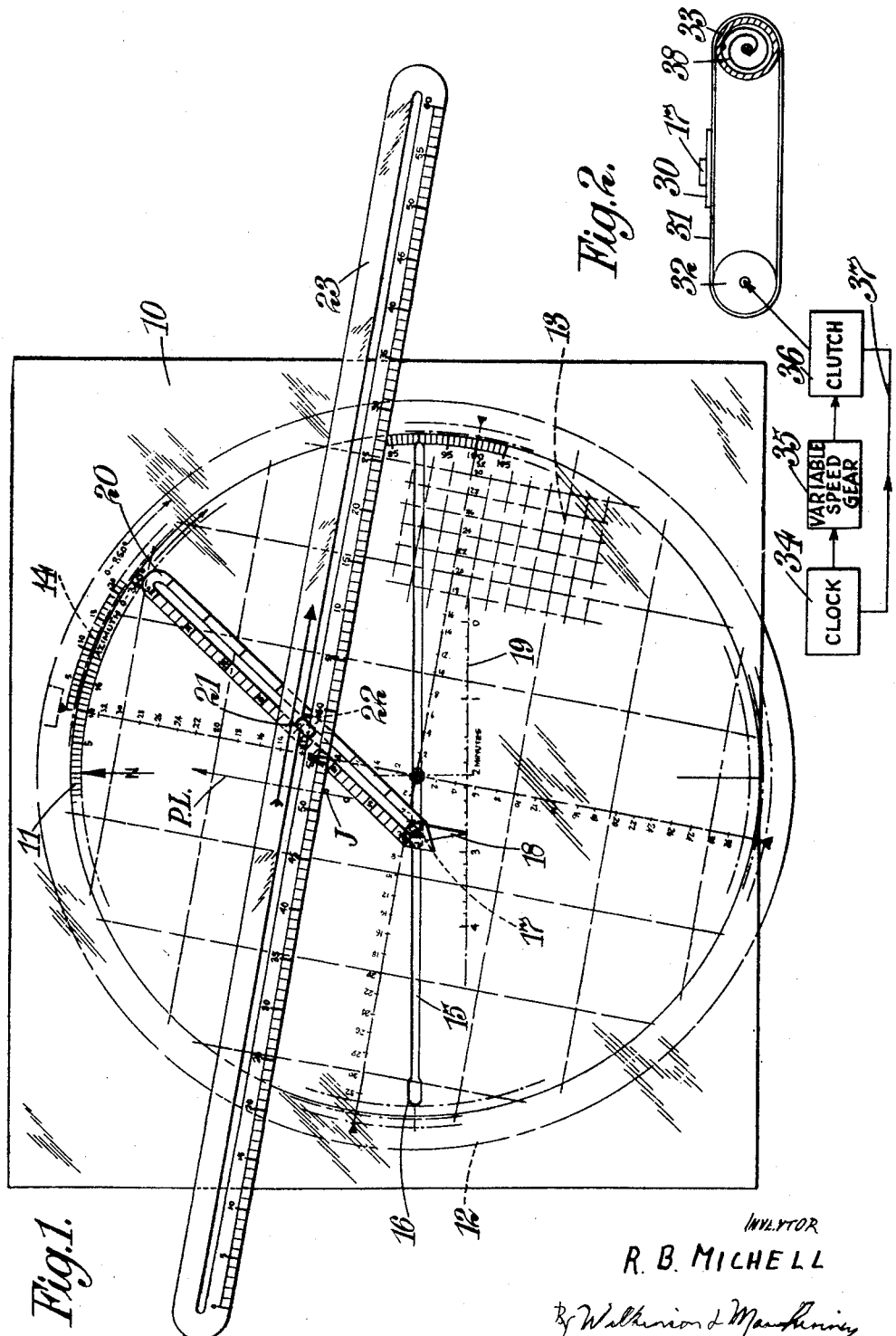
INVENTOR
R. B. MICHELL
ATTYS.

United States Patent Office 2,914,853
Patented Dec. 1, 1959

2,914,853

NAVIGATIONAL APPARATUS

Richard Burgess Michell, Lee-on-Solent, England, assignor of one-half to The Decca Record Company Limited, London, England, a British company Application August 15, 1955, Serial No. 528,423

Claims priority, application Great Britain August 24, 1954

6 Claims. (Cl. 33—1)

This invention relates to apparatus for determining astronomical position lines. As is well known, from observations of stars it is possible to determine position lines on a chart representative of the position of the observer. The principal object of the present invention is to provide an apparatus for facilitating the rapid reduction of star sights.

At the present time star sights are most generally reduced to position lines by making use of tables which tabulate, for each degree of latitude, the azimuth and elevation of a number of selected fixed stars for each degree of local hour angle of the first point of Aries. The tables are entered at a latitude and local hour angle Aries of an assumed position at or near the dead reckoning position of the observer, this assumed position being a whole number of degrees in latitude and local hour angle Aries. It will be appreciated that the local hour angle Aries changes continuously at the rate of a sidereal clock and that it has to be calculated from tabulated values of Greenwich hour angle of the first point of Aries, an assumed longitude and the time of taking the sight. From the tables there is extracted the altitude and azimuth of the star for the assumed position. The difference between the true altitude as measured by a sextant and the tabulated altitude extracted from the tables for the assumed position, in minutes of arc, is equal to the distance of a position line through the observer in nautical miles away from the assumed position. This distance, which is known as the intercept, can be set off on the chart towards or away from the star in the direction of the tabulated azimuth reading according to whether the measured altitude is greater than or less than the tabulated altitude for the assumed position and, through the point thus obtained, the required position line is then drawn on the chart as a line at right angles to the direction of the azimuth of the star. A single star sight enables one position line to be drawn on the chart. Two or more star sights, provided the stars are suitably spaced in azimuth, will give intersecting position lines thereby providing a fix. It will be appreciated, however, that it is not possible to take two or more sights simultaneously and hence the position lines must be corrected for the movement of the observer.

For navigation at sea, it is generally only convenient to take star sights during the twilight periods in the evening and morning since, using an ordinary sextant, it is necessary to be able to see the horizon as well as to see the stars. Thus only a short time is available for making the observations. The general practice, therefore, is to make all the observations and then to proceed with the necessary calculation and plotting. If any errors should be found it may not be possible to take further sights since the calculations are lengthy. By using the apparatus of the present invention and by tabulating certain preliminary information available from the tables before making the observations, it is possible to reduce each observation to a position line in a few seconds, and hence a considerable gain in reliability is possible as each observation can be checked if necessary before passing on to the next star.

According to this invention apparatus for the determination of astronomical position lines comprises a plotting chart, an element (referred to hereinafter as the time element) movable relative to the chart in the east-west direction, an arm (referred to hereinafter as the own motion arm) pivotally carried on said time element, a second arm (referred to hereinafter as the altitude arm) pivotally carried on the own motion arm, which own motion arm is arranged so that the pivot points of the time element and altitude arm are relatively movable in a straight line, and a graticule mounted for rotation with respect of said plotting chart about a point on the line of movement of the time element. The plotting chart may be marked with a compass rose centered on the graticule pivot to facilitate setting of the graticule in a required angular position. Alternatively, however, the graticule may be provided with an index mark for co-operating with a compass rose on the graticule centered about the pivot thereof.

As will be explained hereinafter the required position line is drawn at right angles to the altitude arm and to facilitate the drawing of the position line a position line cursor may be provided which is linearly movable in a straight line along the altitude arm and has an edge or marking extending at right angles to the direction of movement of the cursor along the altitude arm. Although it may be more convenient to dispense with such a position line cursor for reasons to be explained later, reference will be made in the following to this position line cursor as such reference will facilitate explanation as to how the position line is drawn on the chart.

The heavens appear to move past an observer on the earth in a westerly direction at an angular rate of one degree in every four minutes of sidereal time. Thus the local hour angle of a star will change at this rate. The time element of the apparatus is therefore made to move in an east to west direction at a rate corresponding to one degree for every four minutes of sidereal time. This moves the position line cursor westwardly at the same rate. This movement makes the necesary correction for change in local hour angle of the observed star during the period from the start of movement of the time element. The actual magnitude of the movement of the time element with reference to the scale of the plotting chart will depend on the latitude of the observer. This can be pre-calculated and a time scale marked on the plotting chart adjacent the time element. For convenience the time element is moved for four minutes and then returned quickly to its zero position, this movement being repeated during the whole period of the observations. The zero instant for the time scale is made to coincide with a time corresponding to an exact degree of local hour angle Aries so that the altitude and azimuth information required may be extracted from tables without interpolation. Thus each successive four minute movement of the element will correspond to a successive entry in the tables. The time element may be moved manually or it may be driven from a sidereal clock. For most purposes it will be adequate to employ manual movement of the time element and, in this case, a time scale would be marked adjacent the element which is then moved to the appropriate position for each observation.

The own motion arm is set so that the two pivot points are in a line corresponding to the direction of movement of the observer. The pivot points are moved apart, ideally at a rate corresponding to the movement of the observer. In the case of a ship, the movement of the observer will be relatively small and it will suffice merely to set the two pivots the right distance apart for the appropriate observations. It will be seen that the movement of the altitude arm relative to the time element along the own motion arm moves the position line cursor correspondingly and hence makes the appropriate correction for the movement of the observer with the respect to the earth's surface. The arm is preferably provided with a scale in miles corresponding to that used for the plotting chart. The pivots can be moved apart manually so that their spacing is equal to the distance travelled since the zero time of the first movement of the time element.

For each observation the altitude arm has to be set in a direction corresponding to the azimuth of the observed star. Conveniently this is done by rotating the graticule with respect to the plotting chart so that the lines of the graticule are aligned to the appropriate bearing, which may be measured on the aforementioned compass rose, and the altitude arm is then swung about its pivot on the own motion arm so as to be in alignment with the graticule markings. Means may be provided for clamping the altitude arm in this angular position on the own motion arm. The altitude arm is preferably provided with a scale of degrees and minutes of arc, conveniently covering a range of say two degrees, the scale corresponding with the scale of the plotting chart, that is to say the minutes of arc will correspond to nautical miles on the plotting chart. For any observation, the position of the pivot connection between the altitude arm and the own motion arm on the altitude arm is set to a position on the alitude arm scale corresponding to the altitude of the start to be observed at the zero position of the time element, which as stated above will be at an exact degree of local hour angle Aries. It will be recalled that, as stated above, tabulated information of altitude of a star is available for every degree of local hour angle and that provided the zero positon of the time element corresponds to the tabulated data the positon for setting the pivot on the altitude arm is available directly from the tables. It will be appreciated that, for observations on one star, this pivot need be set only once every four minutes. The positon line cursor is then moved to the scale position on the altitude arm corresponding to the observed altitude and the positon line is then drawn on the plotting chart, this line being at right angles to the altitude arm and crossing the scale of the altitude arm at the observed altitude. It may be noted that the position line cursor merely has to be set at a distance from the pivot on the altitude arm equal to the difference between the observed altitude and the tabulated altitude. It would, therefore, be possible to have the altitude arm pivot fixed on the altitude arm and to subtract the two angles (i.e. the observed and tabulated altitudes) and then move the positon line cursor to the appropriate intercept or conversely have the position line cursor fixed and move the altitude arm with respect to the pivot. It is much more convenient and quicker for using the apparatus if the pivot point is set on the altitude arm at a scale reading corresponding to the minutes (of arc) of the tabulated elevation angle and the position line cursor is set at the scale position corresponding to the minutes (of arc) of the observed altitude. For nautical navigation, the difference between the tabulated and observed altitude is unlikely to be more than one degree and hence a scale of only two degrees will be adequate and will avoid any necessity for arithmetical operations.

As is well-known in taking sextant observations, it is necessary to correct for index error, dip and refraction in order to obtain a true altitude. The most convenient way of making these corrections is to tabulate, from the tables, the altitude and azimuth of the selected stars for each whole degree of local hour angle Aries over the period (e.g. 30 minutes) during which observations will be made. The index error, dip and refraction corrections can then be applied with their signs reversed to the tabulated altitudes to give tabulated sextant altitudes which are then used for setting the altitude arm with respect to its pivot.

It will be seen from the above that the movement of the time element and the positioning of the altitude arm pivot will correct for the movement of the observer with respect to the heavens during each four minute period. The use of the successive tabulated values of altitude and azimuth during different four minute periods corrects for the movement over four minute intervals. Hence all the position lines provide position data corrected to the zero time of the first movement of the time element. In practice a number of separate observations are made on each star in rapid succession. All these observations should produce position lines which are coincident. During such a series of observations the azimuth of the observed star does not change. The most convenient way, therefore, of drawing the required position line of the chart is simply for a mark to be put on the chart against the scale point on the altitude arm to which the position line cursor would be set if such a cursor is provided. After all these observations have been made, a single position line is then drawn through all these points in a direction at right angles to the altitude arm. This is very simply and conveniently done with a set square thus dispensing with any need for the aforementioned position line cursor.

If two or more observations are taken on a star, it is readily apparent whether or not they agree. If they should not agree closely enough, it is possible to take a further observation of the same star immediately since the information is apparent as soon as the position line cursor is set or the corresponding points marked.

In practice it will be preferable to have one person using the sextant to take the observations and a second one using the apparatus to determine the position lines. If the time element is moved manually, means may be provided for clamping the time element with respect to the plotting chart so that, when the observer takes a reading, the operator using the apparatus can clamp the time element on the appropriate position on the time scale. However, such a clamp is not necessary provided sufficient friction is introduced into the apparatus to enable the time element to be held steady whilst the observer marks the point through which the position line is to be drawn. If the time element is moved continuously by means of a sidereal clock, it will be necessary to release the own motion pivot from the time element and possibly clamp it whilst the position line point is marked. The own motion arm pivot is then re-engaged with the time element.

It will be seen that all the necessary information from the tables can be extracted and the azimuth and altitude (the latter corrected for dip, refraction and index error) tabulated for the appropriate values of local hour angle Arises before taking any observations. Also the time scale for the time element can be calibrated before taking any observations. The zero time for starting movement of the time element is also pre-calculated and conveniently a sidereal stop-watch is started at this time. Thus during the observations, it is merely necessary to observe the sextant altitude of the various stars, note the stop-watch time of each observation, and as each observation is made, set the time element (assuming a manually operated time element) on the appropriate time scale marking, set the altitude arm in the appropriate angular position and set the altitude arm pivot on the appropriate scale marking (from the tabulated information) move the position line cursor to the observed altitude and draw the position line. From time to time the pivots on the own motion arm can be reset, if necessary, to allow for the movement of the observer but this will often be negligible between successive observations. It will further be noted that, if the latitude remains constant, for nautical navigation, some or all of the pre-calculated data may often be used for several successive days.

Although the operation has been described specifically with reference to stars, the apparatus can be used for reducing sights of other heavenly bodies. It will be appreciated that, the declinations of the sun, moon and planets of the solar system are not constant unlike those of the stars and hence more calculation will be necessary beforehand.

The plotting chart conveniently is made of a transparent material, preferably having a surface suitable for writing on with a pencil. In this case the graticule may be mounted underneath the chart. The plotting chart may have a slot in which the time element is guided.

The own motion arm conveniently comprises an arm with a longitudinal slot in which are movable the pivots for either the altitude arm or the time element or for both.

The position line cursor conveniently is arranged to have a portion which extends into and is guided along a slot in the altitude arm.

For convenience the graticule is preferably made with lines of some convenient distance apart e.g. two nautical miles, on the scale of the plotting chart. The plotting chart need not have any markings at all except a compass rose or an index mark for co-operating with a compass rose on the rotatable graticule. The scale of the plotting chart is determined by the scales on the altitude arm and the own motion arm. The zero point of the time element corresponds to the assumed position at zero time and thus the intersection of the position lines can readily be read off as a range and bearing from the assumed position or the differences in latitude and longitude between the fixed and the assumed position may be measured.

The following is a description of one embodiment of the invention, reference being made to the accompanying drawings in which:

Figure 1 is a diagram illustrating one embodiment of the invention; and

Figure 2 is a diagram illustrating a modification of part of the arrangement of Figure 1.

Referring to the Figure 1, there is shown a rectangular plotting chart 10 on which is marked a compass rose 11. This plotting chart is formed of transparent material, conveniently a transparent plastic material and mounted beneath the chart 10 so as to be visible therethrough is a rotatable member 12 bearing a graticule 13 and a compass rose 14, the member 12 being rotatable about the centre of the compass rose 11. Conveniently the member 12 is sandwiched between the chart 10 and a base plate similar in size to the chart 10, part of the member 12 protruding from beneath one edge of the chart to enable the member 12 to be turned manually. The chart 10 has a slot 15 extending across it through the axis of the pivot member 12, this slot having an enlarged portion 16 at one end. A slider 17 slidably engages in this slot and forms the aforementioned time element. The enlarged portion 16 of the slot enables the slider 17 to be removed, for dismantling the apparatus, this enlarged portion providing sufficient clearance to enable flanges of the slider, which normally engage the underside of the plotting chart surface, to be moved out of engagement with that surface. Alternatively the astro plotting arm can be replaced by centrally pivoted arms so that the apparatus could be readily adapted for relative motion problems. The slider 17 is provided with a pointer 18 for co-operation with a time scale 19 which is drawn on the chart as required. Pivotally mounted on the slider 17 is a slotted arm 20 in the slot of which runs an element 21 pivotally connected to an element 22 which runs in a slot on an arm 23. The arm 20 forms the aforementioned own motion arm and the arm 23 forms the altitude arm. The own motion arm 20 is calibrated with a scale of nautical miles corresponding to the scale of the chart. The altitude arm 23 is calibrated with a scale of minutes of arc covering a range of 2°, this scale again corresponding with the chart scale. Both the arms 20 and 23 are conveniently made of transparent plastic material; the arm 20 is preferably made as a thin strip so that the arm 23 lies closely adjacent the top surface of the chart 10 thereby eliminating parallax.

When the apparatus is to be used for reducing star sights, the time scale 19 is marked on the drawing. It will be appreciated that this time scale will be dependent on the latitude and it is drawn on the basis of an assumed latitude since that will be accurate enough for this purpose. For convenience the time scale is marked for a length of four minutes i.e. corresponding to the time interval of successive entries in the tables to be used, and conveniently the centre point of the time scale is made to coincide with the pivot axis. The zero point of the time scale is the assumed position at zero time and, as previously explained, this assumed position is made an exact degree of latitude and an exact degree of local hour angle Aries in order to facilitate reference to the tables. Thus having marked the zero point of the time scale, the latitude and longitude co-ordinates on the chart are now defined. The member 12 carrying the graticule 13 is now rotated so that the graticule is aligned with the azimuth of the observed star; in the drawing this azimuth is shown as 100°. The own motion arm 20 is set in a direction of the compass rose 11 corresponding to the direction of the ship's track; in the drawing the arm 20 is set for a track of approximately 215°. The element 21 is adjusted along the length of the arm 20 in accordance with the distance travelled by the ship since the time of the assumed position, that is to say the zero time. In the drawing, it has been assumed that the ship has travelled 15.5 miles during this time. The position of the pivot along the altitude arm is set to the tabulated altitude of the star to be observed at the zero position of the time element. It will be appreciated that the observations may extend over a period of more than four minutes; for convenience, therefore, the altitudes at each of the four minute intervals are tabulated on the chart. In the particular example shown in the drawing the pivot has been set at 50° 57'.8. Since only differences of altitude are utilised, the zero point on the scale of the altitude arm in this case is regarded as 50 degrees. Having set up the apparatus, an observation of altitude of the star is taken with the sextant and the time noted. In a particular example the sidereal time was 2 minutes 48 seconds, and the observed altitude was 50° 52'. The time element 17 is moved to bring the pointer 18 along the time scale to the point corresponding to two minutes 48 seconds and a mark is then placed against the edge of the altitude ruler corresponding to 52 minutes of arc as indicated on the drawing by the point marked J. A second J point from a separate observation is also marked on the drawing. Two or more such observations may be made and then a position line PL is drawn at right angles to the altitude arm 23. Further observations may then be made on another star after the altitude ruler has been adjusted to the azimuth of the new star and a second position line drawn. The intersection of these position lines then gives the position of the vessel at the zero time.

In the arrangement of Figure 1, the time element 17 is moved manually for each observation. Provision may be made for moving this element automatically as is indicated diagrammatically in Figure 2. The time element 17 is carried on a member which is traversed by means of a wire 31 on drums 32, 33. The drum 32 is driven by means of a clock 34 through a variable speed gear 35 (for adjusting the rate of movement of the element 17 in accordance with the assumed longitude and course and speed of observer if required) and a clutch 36. The clutch, by means of a linkage 37 from the clock, is automatically released for a short time and then re-engaged every four minutes. During this short time, the element 17 on its mount 30 is returned to its zero position by means of a spring 38 acting on the drum 33. To enable the element 17 to be held steady whilst an observation is plotted, it may be made disengageable from the mount 30 and, if desired, it may be provided with a clamp for clamping to the chart. As soon as the reading is plotted, the element 17 is manually moved to re-engage with the mount 30 in the new position of the mount, which is continually being traversed by the wire 31. It will be readily apparent that there are many other constructional arrangements by which the time element 17 may be periodically traversed and quickly returned to its starting point.

I claim:

1. Apparatus for the determination of astronomical position lines comprising a graticule, a plotting chart through which said graticule may be observed having a slot extending in a straight line partially across the chart, said graticule being mounted underneath the chart for rotation with respect to the chart about an axis passing through said straight line normal to the planes of the chart and graticule, an element slidably mounted in said slot, an own motion arm pivotally carried on said element for angular movement about a first pivot axis normal to the plane of the chart, and an altitude arm pivotally carried on said own motion arm and otherwise unrestrained at any other point along its length for positioning in any angular position with respect to said own motion arm about a second pivot axis normal to the plane of the chart, said own motion arm being arranged so that the pivot points defining said first and second pivot axes are relatively movable in a straight line.

2. Apparatus as claimed in claim 1 wherein clamp means are provided for clamping said element in said slot.

3. Apparatus as claimed in claim 2 wherein said own motion arm comprises an arm with a longitudinal slot and a slide member movable along the slot and wherein said altitude arm is pivotally carried on said member.

4. Apparatus as claimed in claim 3 wherein said altitude arm comprises an arm with a longitudinal slot and a slide member movable along the slot, which slide member is pivotally carried on the slide member of said own motion arm.

5. Apparatus as claimed in claim 4 wherein clamp means are provided for clamping each of said slide members in their respective slots.

6. Apparatus for the determination of astronomical position lines comprising a plotting chart, an element linearly movable relative to the chart along a straight line, a clock-driven mechanism for driving said element at a uniform rate for a predetermined time along said straight line and for automatically returning said element to its starting point before re-commencing movement at uniform rate, an own motion arm pivotally carried on said element for angular movement about a first pivot axis normal to the plane of the chart, an altitude arm pivotally carried on said own motion arm and otherwise unrestrained at any other point along its length for positioning in any angular position with respect to said own motion arm about a second pivot axis normal to the plane of the chart, said own motion arm being arranged so that the pivot points defining said first and second pivot axes are relatively movable in a straight line, and a graticule mounted for rotation in a plane parallel to the plane of the chart about a point on the line of movement of said element.

References Cited in the file of this patent

UNITED STATES PATENTS 2,386,555     Hughes et al.            Oct. 9, 1945
2,717,448     Lubin et al.             Sept. 13, 1955